(12) United States Patent
Nichols et al.

(10) Patent No.: US 10,162,070 B2
(45) Date of Patent: Dec. 25, 2018

(54) CONVERTING A FIRST ACQUIRED DATA SUBSET TO A SECOND ACQUIRED DATA SUBSET

(71) Applicant: WESTERNGECO L.L.C., Houston, TX (US)

(72) Inventors: David Nichols, Palo Alto, CA (US); Everett Mobley, Jr., Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 1118 days.

(21) Appl. No.: 13/666,801

(22) Filed: Nov. 1, 2012

(65) Prior Publication Data

US 2013/0265852 A1 Oct. 10, 2013

Related U.S. Application Data

(60) Provisional application No. 61/620,580, filed on Apr. 5, 2012.

(51) Int. Cl.
*G01V 1/00* (2006.01)
*G01V 1/28* (2006.01)

(52) U.S. Cl.
CPC ............ *G01V 1/28* (2013.01); *G01V 2210/40* (2013.01)

(58) Field of Classification Search
USPC .......................................................... 367/73
See application file for complete search history.

(56) References Cited

U.S. PATENT DOCUMENTS

| | | | | |
|---|---|---|---|---|
| 6,035,057 A * | 3/2000 | Hoffman | ................... | G01S 7/12 382/159 |
| 6,233,361 B1 * | 5/2001 | Downs | .................. | G01S 7/4802 348/E5.064 |
| 6,665,335 B1 * | 12/2003 | Rajagopal | ............... | G01S 7/292 375/224 |
| 6,831,591 B2 * | 12/2004 | Horibe | .................. | G01S 7/4026 342/174 |
| 8,760,967 B2 * | 6/2014 | Nichols | .................. | G01V 1/301 367/53 |
| 9,726,772 B2 * | 8/2017 | Zhao | ....................... | G01V 1/362 |
| 2005/0222773 A1 | 10/2005 | Cavalca et al. | | |
| 2006/0253759 A1 | 11/2006 | Wei | | |

(Continued)

FOREIGN PATENT DOCUMENTS

| | | |
|---|---|---|
| CA | 2775561 A1 | 4/2011 |
| EP | 0202745 | 11/1986 |
| EP | 0228231 | 7/1987 |

(Continued)

OTHER PUBLICATIONS

Xie, Xiao-Bi, Shengwen Jin, and Ru-Shan Wu. "Wave-equation-based seismic illumination analysis." Geophysics 71.5 (2006): S169-S177.*

(Continued)

*Primary Examiner* — Isam A Alsomiri
*Assistant Examiner* — Jonathan D Armstrong
(74) *Attorney, Agent, or Firm* — Michael Guthrie

(57) ABSTRACT

Acquired data that corresponds at least in part to a target structure is received. One or more subsets of a first type are formed from the acquired data. The one or more subsets of the first type are converted to one or more subsets of a second, different type.

18 Claims, 4 Drawing Sheets

(56) References Cited

U.S. PATENT DOCUMENTS

| | | |
|---|---|---|
| 2010/0299071 A1 | 11/2010 | Kiyashchenko et al. |
| 2016/0291183 A1* | 10/2016 | Hu .................. G01V 1/282 |

FOREIGN PATENT DOCUMENTS

| | | |
|---|---|---|
| WO | 2008/053489 A2 | 5/2008 |
| WO | 2011/152928 A1 | 12/2011 |

OTHER PUBLICATIONS

Sava, Paul, and Sergey Fomel. "Coordinate-independent angle-gathers for wave equation migration." 2005 SEG Annual Meeting. Society of Exploration Geophysicists, 2005.*

Jin, Shengwen, and Shiyong Xu. "Visibility analysis for target-oriented reverse time migration and optimizing acquisition parameters." The Leading Edge 29.11 (2010): 1372-1377.*

Xu, Shiyong, and Shengwen Jin. "Can we image beneath salt body?—Target-oriented visibility analysis." 2005 SEG Annual Meeting. Society of Exploration Geophysicists, 2005.*

Halpert, Adam D., Robert G. Clapp, and Biondo Biondi. "Speeding up seismic image segmentation." 2010 SEG Annual Meeting. Society of Exploration Geophysicists, 2010.*

Askim, Ole Jøran, et al. "Wave-equation-based illumination determination for Amplitude versus Angle risk assessment." 2010 SEG Annual Meeting. Society of Exploration Geophysicists, 2010.*

Gherasim, Mariana, et al. "Wave-equation angle-based illumination weighting for optimized subsalt imaging." Proceedings of the 80th Annual International Meeting. 2010.*

Shen, Hao, Sabaresan Mothi, and Uwe Albertin. "Improving subsalt imaging with illumination-based weighting of RTM 3D angle gathers." 2011 SEG Annual Meeting. Society of Exploration Geophysicists, 2011.*

Xu, Qing, et al. "Reverse time migration using vector offset output to improve subsalt imaging-A case study at the Walker Ridge GOM." 73rd EAGE Conference & Exhibition. 2011.*

O'Briain, Michael, et al. "Improved Subsalt Imaging and Salt Interpretation by RTM Scenario Testing and Image Partitioning." 2013 SEG Annual Meeting. Society of Exploration Geophysicists, 2013.*

Charles J. Ammon. Dept. of Geosciences, Penn State University. The Normal Vector of a Fault Surface—From Strike & Dip to a Fault Normal. Aug. 13, 2001. URL:http://eqseis.geosc.psu.edu/~cammon/HTML/UsingMATLAB/PDF/ML1%20FaultNormals.pdf.*

Ji, Jun. "Prestack migration velocity analysis using wavefront synthesis." Stanford Exploration Project, Report 82, May 11, 2001, pp. 1-88.*

Fomel, Sergey, and Marie Prucha. "Angle-gather time migration.", Stanford Exploration Project; 100 (1999): 359-368. (Year: 1999).*

Al-Yahya, "Velocity Analysis by Iterative Profile Migration," Stanford Exploration Project No. 53, Aug. 1987: pp. 1-86.

International Search Report and Written Opinion of PCT Application No. PCT/US2013/035317 dated Jun. 26, 2013: pp. 1-11.

Extended Search Report for the equivalent European patent application 13772899.4 dated Dec. 15, 2015.

Communication pursuant to Article 94(3) for the equivalent European patent application 13772899.4 dated Jan. 8, 2016.

* cited by examiner

CONVERTING A FIRST ACQUIRED DATA SUBSET TO A SECOND ACQUIRED DATA SUBSET

CROSS-REFERENCE TO RELATED APPLICATION

This application claims the benefit of U.S. Provisional Patent Application Ser. No. 61/620,580 filed Apr. 5, 2012, which is hereby incorporated by reference in its entirety.

BACKGROUND

Survey data can be acquired using a survey acquisition system that can include one or more survey sources and one or more survey receivers. Examples of survey sources and survey receivers include seismic sources and seismic receivers. A seismic source can be activated to produce seismic energy that is propagated into a subsurface formation, and reflected seismic energy can be detected by a seismic receiver.

Data acquired by one or more seismic receivers in response to activation of one or more seismic sources can be processed to develop an image of the subsurface formation. An example type of data processing includes data migration, in which seismic events in the acquired seismic data can be geometrically re-located (migrated) in either space or time, or both, to the locations where the seismic events occurred in the subsurface formation. Based on the migrated data, an image of the subsurface formation can be developed.

SUMMARY

In general, according to some implementations, a method includes receiving acquired data that corresponds at least in part to a target structure, forming one or more vector image partition (VIP) gathers from at least part of the acquired data, and converting the one or more VIP gathers into one or more angle gathers.

In further or other implementations, the converting includes converting the one or more VIP gathers into one or more approximate angle gathers.

In further or other implementations, the converting uses an approximate velocity model.

In further or other implementations, the approximate velocity model is a one-dimensional (1D) velocity model.

In further or other implementations, the converting uses a one-dimensional (1D) velocity model.

In further or other implementations, using the approximate velocity model comprises using the approximate velocity model in a mapping function that maps between the one or more VIP gathers and the one or more angle gathers.

In further or other implementations, using the approximate velocity model comprises using the approximate velocity model to compute a source direction of a source seismic wave.

In further or other implementations, the converting includes using the computed source direction in mapping the one or more VIP gathers to one or more angle gathers.

In further or other implementations, a moveout of the one or more angle gathers is mapped to a domain of the one or more VIP gathers.

In further or other implementations, tomography processing is performed using the mapped moveout.

In general, according to further implementations, an article comprising at least one machine-readable storage medium stores instructions that upon execution cause a system to receive acquired data that corresponds at least in part to a subsurface formation, form one or more subsets of a first type from the acquired data, convert the one or more subsets of the first type to one or more subsets of a second, different type, and apply processing relating to the subsurface formation on the one or more subsets of the second type.

In further or other implementations, the converting uses a velocity model of the subsurface formation that includes velocities as a function of a plurality of coordinates.

In further or other implementations, the converting uses a velocity model of the subsurface formation that includes velocities as a function of one coordinate.

In further or other implementations, the one or more subsets of the second type are approximate one or more subsets of the second type, and where applying the processing comprises mapping data of the approximate one or more subsets of the second type to a domain of the one or more subsets of the first type.

In further or other implementations, the one or more subsets of the first type include vector image partition (VIP) gathers for corresponding different values of an offset between a location of a survey source and a surface location of acquired data.

In further or other implementations, the one or more subsets of the second type include angle gathers for corresponding different values of an angle between a direction of a source wave and a direction that is normal to a dip.

In further or other implementations, the converting includes decomposing a particular one of the VIP gathers into a plurality of dip components for respective dips.

In further or other implementations, the converting uses an angle mapping function that maps between the angle and a difference between the direction of the source wave and the direction that is normal to the dip.

In general, according to other implementations, a system includes at least one processor to receive acquired data that corresponds at least in part to a target structure, form one or more subsets of a first type from the acquired data, convert the one or more subsets of the first type to one or more subsets of a second, different type, and apply processing relating to the target structure on the one or more subsets of the second type.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Migration of acquired seismic data (as measured by one or more seismic receivers in response to activation of one or more seismic sources) can be performed using any one of various different migration techniques, including, as examples, reverse time migration (RTM), Kirchhoff depth migration, Gaussian beam migration, wave-equation migration, and so forth. In the ensuing discussion, reference is made to techniques or mechanisms applied on acquired seismic data for use in RTM. However, in other implementations, techniques or mechanisms are applicable to acquired seismic data for other imaging techniques.

In performing seismic data acquisition, various traces of seismic data can be recorded by respective seismic receivers. A trace of seismic data refers to the seismic data recorded by a particular channel of the data acquisition system, where the channel can correspond to one seismic receiver or a group of seismic receivers. Similarly, the output of migration may include one or more data records, also referred to as traces, at a common surface location. A collection of traces, either input or output, with a common attribute, such as source location or migrated output location, can be referred to as a gather.

Subsets of the traces can be derived, and processing can be performed based on the subsets. The processing can include processing relating to tomography (for updating a velocity model used to produce an image of a subterranean formation), stacking (combining multiple traces for reducing noise or to improve overall data quality), or other types of processing. In some examples, subsets can include vector image partition (VIP) gathers that can be output from RTM. In the case of VIP gathers, the common attribute is the vector offset from a seismic source (hereinafter referred to as the "source location") to the point on the surface corresponding to a migrated image location.

In the present discussion, reference is made to techniques or mechanisms applied with respect to subsurface formations. However, techniques or mechanisms according to some implementations can also be applied with respect to other target structures that are the subject of a survey, such as human tissue, mechanical structures, and so forth.

Figure 1:
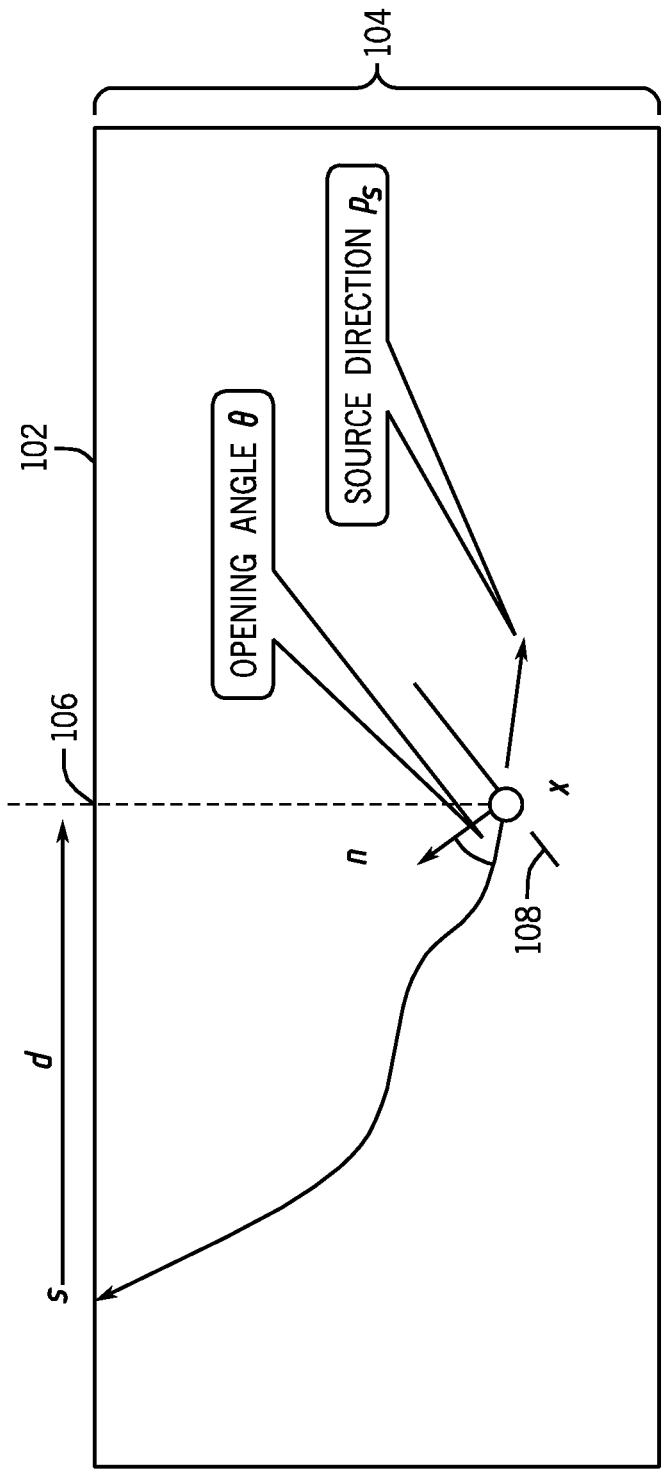
FIG. 1 is a schematic view of an example arrangement relating to a subterranean formation.

FIG. 1 depicts an example that includes a source location s and an image location x that is in a subsurface formation 104 underneath an earth surface 102. The image location x is the location of a seismic trace representing an element in the subsurface formation 104. As indicated by a vertical dashed line in FIG. 1, the image location x can be projected to a surface image location 106 at the earth surface 102. A distance (or offset) between the shot location s and the surface image location 106 that corresponds to the projection of the image location x to the earth surface 102 is represented as d. Different traces within the VIP gather at 106 correspond to different values of d. More generally, a VIP gather can contain seismic traces for a specific range of d values, where the range of d values can include just one or multiple d values.

A VIP gather can be considered a partial stack of a seismic volume that includes seismic data at various points in the subsurface formation 104. The bins (traces) of the stack are partitioned based on values of d.

It is relatively computationally efficient to compute VIP gathers. VIP gathers can be used for various purposes, including performing quality checks of a velocity model, to optimize (or otherwise improve) a stacking process, and so forth. For example, VIP gathers can be muted by attenuating incoherent energy (e.g. noise) such that the appearance of a stack can be improved.

However, VIP gathers may not be effectively used for tomography (for the purpose of producing an image based on the acquired seismic data). This is because moveout in a VIP gather is a function of both dip and angle (and also based on correctness of a velocity model). Moveout can refer to a difference in arrival times, or depths, of a reflected wave measured by seismic receivers at different offset locations with respect to a seismic source. A dip refers to a magnitude of an inclination of a planar feature in the subsurface formation 104 from a horizontal plane. A representation of a dip is shown as a slanted line 108 in FIG. 1. Angle is represented as angle θ, which is also referred to as the opening angle.

Figure 2:
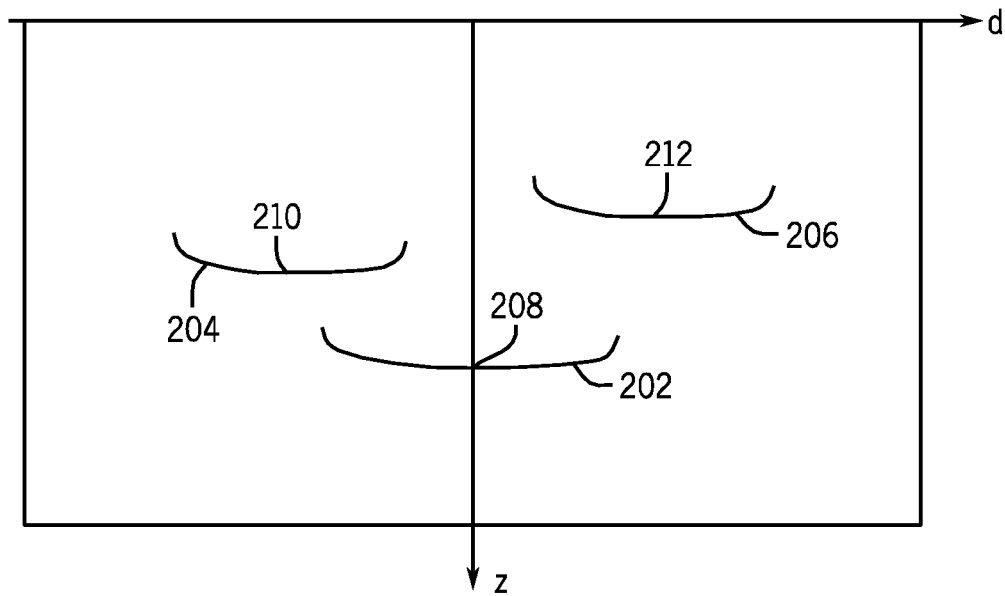
FIGS. 2 and 3 are schematic views of moveouts according to some examples.
Figure 3:
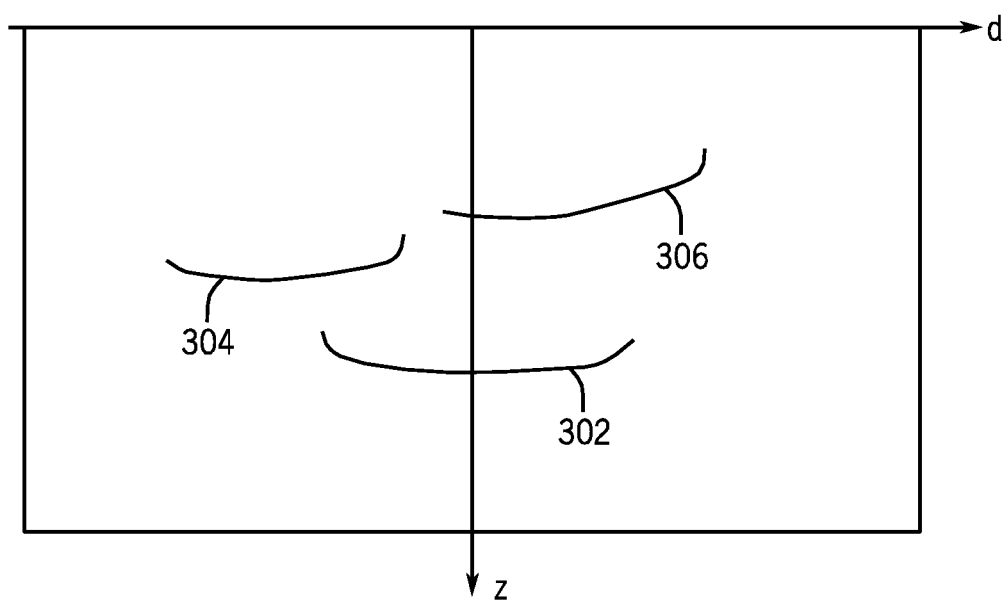

Moveouts are depicted in FIGS. 2 and 3. FIG. 2 shows various moveouts (represented by respective curves 202, 204, and 206) for respective different events. The curve 202 represents a flat event, and the curves 204 and 206 represent respective dipping events. More specifically, curve 206 represents a positive dipping event, where the event dips along a northeast to southwest direction, similar to that of the line 108 in FIG. 1. On the other hand, curve 204 represents a negative dipping event, where the event dips in a northwest to southeast direction.

In FIG. 2, the horizontal axis represents d, while the vertical axis represents depth (z). The distance d represented by a vector from s to 106 corresponds to a point on the horizontal d axis in FIG. 2. Points 208, 210, and 212 on the respective curves 202, 204, and 206 correspond to a location where the opening angle θ is zero. As the opening angle θ increases or decreases from zero, the moveout changes, as represented by the respective curves 202, 204, and 206. The curved edges that form smiles at the ends of the respective curves 202, 204, and 206 result from edge effects.

Not only do the moveouts represented by the curves 202, 204 and 206 change as a function of the opening angle θ, the different curves 202, 204, and 206 corresponding to different types of dips (flat event, positive dipping event, and negative dipping event) indicates that moveout is also a function of dip.

FIG. 2 assumes that a velocity model used for deriving the moveouts is correct. A velocity model includes estimates of velocity parameters at various locations within a volume representing the subsurface formation 104.

FIG. 3, on the other hand, depicts moveouts (represented by curves 302, 304, and 306) in a scenario where a velocity model is incorrect. The curves 302, 304, and 306 represent the same events as the corresponding curves 202, 204, and 206 in FIG. 2, except that the velocity model for the FIG. 3 representation is incorrect. With an incorrect velocity model, curvature of a moveout can be caused by some combination of the following effects: dip, opening angle, and incorrect velocity. As a result, in the presence of an incorrect velocity model, a VIP gather can become confusing to interpret.

Because moveouts in a VIP gather can vary as a function of dip, angle, and correctness of a velocity model, it can be difficult to use the VIP gather in tomography or other types of operations.

In accordance with some implementations, VIP gathers can be converted to angle gathers to allow for use in tomography processing or other types of processing. Angle gathers are computationally expensive to derive from acquired seismic data. Therefore, by using techniques according to some implementations, VIP gathers can first be derived, which are relatively computationally efficient. The VIP gathers can then be converted to angle gathers for use in tomography processing or other types of processing.

Figure 4:
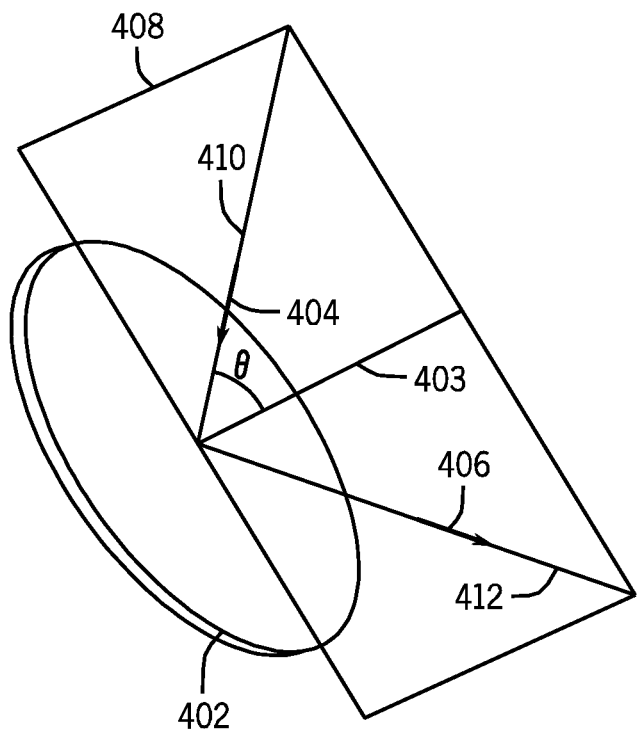
FIG. 4 is a schematic view of various parameters relating to angle gathers, according to some examples.

An angle gather is a collection of seismic experiments at various reflection angles and surface azimuths existing at a particular image location in the subsurface formation. For example, as shown in FIG. 4, a reflector 402 is provided in a subterranean formation, normal to direction 403, and an incoming seismic wave 410 arrives at the reflector 402 along direction 404. The incoming seismic wave is reflected by the reflector 402 to provide a reflected seismic wave 412 along direction 406. As further depicted in FIG. 4, a plane 408 containing the incoming wave direction 404 and reflected wave direction 406 is perpendicular to the reflector 402. The reflection angle is represented by θ in FIG. 4, while a surface azimuth is represented by the rotational angle of the plane 408 with respect to north.

Figure 5:
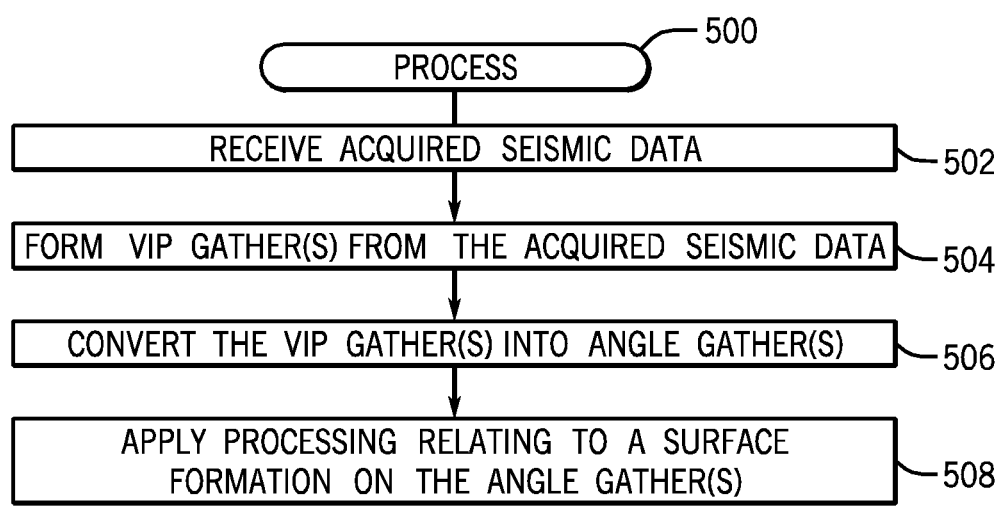
FIG. 5 is a flow diagram of a process for converting between different types of gathers, in accordance with some implementations.

FIG. 5 is a flow diagram of a process 500 according to some implementations. The process 500 receives (at 502) seismic data acquired by a seismic acquisition system, which can include seismic sources and seismic receivers (or other types of survey sources and survey receivers). The acquired data corresponds to a subsurface formation, such as 104 in FIG. 1, or another target structure. The process 500 forms (at 504) one or more VIP gathers from at least part of the acquired data. The process 500 then converts (at 506) the one or more VIP gathers into one or more angle gathers.

The process 500 can then apply (at 508) processing relating to the subsurface formation or other target structure on the one or more angle gathers. As noted above, such processing can include tomography processing, to produce an image of the subsurface formation or other target structure. In other examples, other types of processing can be applied on the one or more angle gathers, including quality checking of a velocity model, velocity model building or updating, characterization of a reservoir in the subsurface formation, and so forth.

Although the foregoing refers to producing VIP gathers and converting the VIP gathers to angle gathers, it is noted that techniques according to some implementations can be applied to other types of subsets of acquired seismic data. For example, task 504 of the process 500 can produce a first type of one or more subsets of the acquired seismic data. Then, task 506 can convert the first type of subset(s) into a second, different type of one or more subset(s), on which the processing of task 508 can be applied.

The following describes in detail how the conversion from VIP gathers to angle gathers can be performed.

In FIG. 1, the surface image location 106 (which corresponds to the subsurface image location x in FIG. 1) can be represented as i. The offset d=i−s is a two-dimensional quantity in the two horizontal axes (parallel to the surface 102). In addition, the image location x is a three-dimensional quantity in the two horizontal axes and the vertical axis. Consequently, a VIP gather, which depends on x and d and is represented as I(x,d), is a five-dimensional (5D) volume. The stacking of multiple VIP gathers I(x,d), for different d values, to form an overall image I(x) of the subsurface formation, is represented as follows:

$$I(x) = \sum_{d} I(x, d).$$ (Eq. 1)

For a given image location, x, and a given offset, d, as shown in FIG. 1, a source seismic wave from the source s has a source direction. The source direction can be represented as a phase slowness direction of the source seismic wave, as represented by $p_s$. One way to estimate the phase slowness direction is to shoot a ray from x to s, or s to x. Another way to estimate this direction is to propagate a wave from s to x and measure the phase slowness for each time step.

A VIP gather, I(x,d), can be decomposed into a set of separate dip components, as follows:

$$I(x,d) \rightarrow I(x,d,n).$$ (Eq. 2)

In Eq. 2, I(x,d,n) represents a dip components as a function of each of x, d, and n, where n represents a normal vector (shown in FIG. 1) that is normal to the dip represented by line 108. Different dip components I(x,d,n) correspond to different values of the normal vector, n. The decomposition should be a partition of unity so that when all (or a plurality of) the dip components are summed together, the original VIP gathers are obtained, as expressed below:

$$I(x,d) = \Sigma_n I(x,d,n).$$ (Eq. 3)

Once the source direction, $p_s$, and a dip (as represented by the normal vector n) are obtained, the opening angle θ can be estimated. The opening angle θ is the difference between the normal vector, n, and the phase slowness direction, $p_s$, of the source seismic wave.

The VIP gathers include two-dimensional bins of d in that they represent a range of d and thus a range of s. Rays or waves can be traced to obtain the phase direction range for the potential source distances that have been stacked into a bin. Alternatively, an approximate solution can be employed where the central phase direction value in the bin is used. The best choice may depend on the granularity of the binning in d.

With an estimate of the opening angle θ for each point in the image (for each dip and each VIP gather), VIP gathers can be mapped to angle gathers.

From ray tracing or wave propagation, an angle mapping function θ(x,d,n)=$p_s$(x,d,m)−n(x) and the reverse map, d(x,θ,n)=G(x,n,θ,m), can be obtained, where m is the velocity model used for wave propagation. In the foregoing, $p_s$(x,d,m) represents the source direction of the source seismic wave, which is a function of x, d, and m. The parameter n(x) is the normal vector depicted in FIG. 1, and is a function of x. The parameter θ(x,d,n) represents the opening angle depicted in FIG. 1, and is a function of x, d, and n. From the foregoing, it can be seen that the opening angle θ is estimated from $p_s$ and n.

The reverse map, d(x,θ,n)=G(x,n,θ,m), is derived based on solving for d in the equation θ(x,d,n)=$p_s$(x,d,m)−n(x).

The angle mapping function θ(x,d,n)=$p_s$(x,d,m)−n(x) provided above is used to map images from d to θ for each dip (represented by n) and image location (x), which performs a mapping between VIP gathers and angle gathers. The mapped images can be summed over dips, represented by Eqs. 4 and 5 below.

$$I(x, n, \theta) = \int_d I(x, n, d(x, \theta, n)),$$ (Eq. 4)

$$I(x, \theta) = \sum_n I(x, n, \theta),$$ (Eq. 5)

In Eq. 5, I(x,n,θ) represents an image gather for a respective angle value θ, and the summation of the image gathers over multiple dips (represented by n) produces an image of the subterranean formation, I(x,θ).

The foregoing describes a feasible way to transform VIP gathers to angle gathers, where the angle gathers produced are exact versions of the angle gathers given the VIP gathers.

In other implementations, for enhanced computational efficiency, approximate versions of angle gathers can be derived from VIP gathers, as discussed below. For certain applications, approximate versions of angle gathers can still be used to provide useful analyses. With the approximate solution, angles of the angle gathers may not be correct angles.

To produce approximate angle gathers from VIP gathers, an approximate version of the angle mapping function, θ(x,d,n) is used.

According to a first technique, instead of using the full velocity model m in the angle mapping function θ(x,d,n)= $p_s$(x,d,m)−n(x), a one-dimensional (1D) velocity model V(z) is used instead. In such example, the angle mapping function becomes an approximate angle mapping function $\hat{\theta}$(x,d,n) that is computed using the 1D velocity model V(z). With the 1D velocity model, the conversion process between the VIP gathers and the angle gathers can be computed more quickly. The 1D velocity model V(z) has velocities that vary as a function of just depth z, whereas the full velocity model m has velocities that vary as a function of all three coordinates.

According to a second technique, the source direction, $p_s$, can be approximated, based on the following: $\hat{p}_s$(x,d)=H(z, d,V(z)), where H(z,d,V(z)) is a function that defines an approximate solution for the source direction $p_s$(x,d) using the 1D velocity model V(z).

Using either approach discussed above, angle gathers that are produced are referred to as pseudo-angle gathers (which are approximate angle gathers), since the angles within the pseudo-angle gathers are approximate angles that may not be correct. Note, however, that even with approximate angles in the pseudo-angle gathers, the pseudo-angle gathers can still be useful in various processes. For example, moveouts can be picked from the pseudo-angle gathers, muting can be applied on the pseudo-angle gathers (to reduce noise, for example), filtering can be applied on the pseudo-angle gathers, stacking can be performed on the pseudo-angle gathers, and so forth.

To perform tomography processing, the pseudo-angle gathers cannot be used directly, since the angles may not be correct. However, a moveout picked from a pseudo-angle gather can be mapped back to the VIP domain (of VIP gathers) for finding a ray pair used for tomography. A ray pair includes a first ray representing a source seismic waveform in the subterranean formation, and a second ray representing a reflected seismic waveform that is a reflection of the source seismic waveform from a reflector in the subterranean formation.

An angle of a pseudo-angle gather can be represented as a pseudo-angle (or approximate angle) $\hat{\theta}$. From the pseudo-angle gather, a moveout can be picked, where the moveout has a depth z(i,$\hat{\theta}$), where i is the surface image location 106 shown in FIG. 1. To find the ray pair from the seismic source to the seismic receiver, the following procedure can be used.

The pseudo-angle $\hat{\theta}$ is mapped to d using the inverse mapping, d(x,θ,n)=G(x,n,θ,m) noted above, except that θ is replaced with $\hat{\theta}$, and the 1D velocity model V(z) is used in place of m. Using the inverse mapping, the source location s=i−d is derived. Then, two-point ray tracing can be used to find a ray from s to x (the image location in the subterranean formation).

Given the dip in the data of the pseudo-angle gather, Snell's law can be solved to find the receiver ray direction (the ray from x to the seismic receiver). The receiver ray is then propagated to the surface 102 (FIG. 1). At this point, the ray pair (ray from s to x, and ray from x to the seismic receiver) to be used for tomography has been identified.

Next, as part of the tomography processing, traveltime differentials along each ray can be calculated and converted to depth differentials for the picked moveout.

Figure 6:
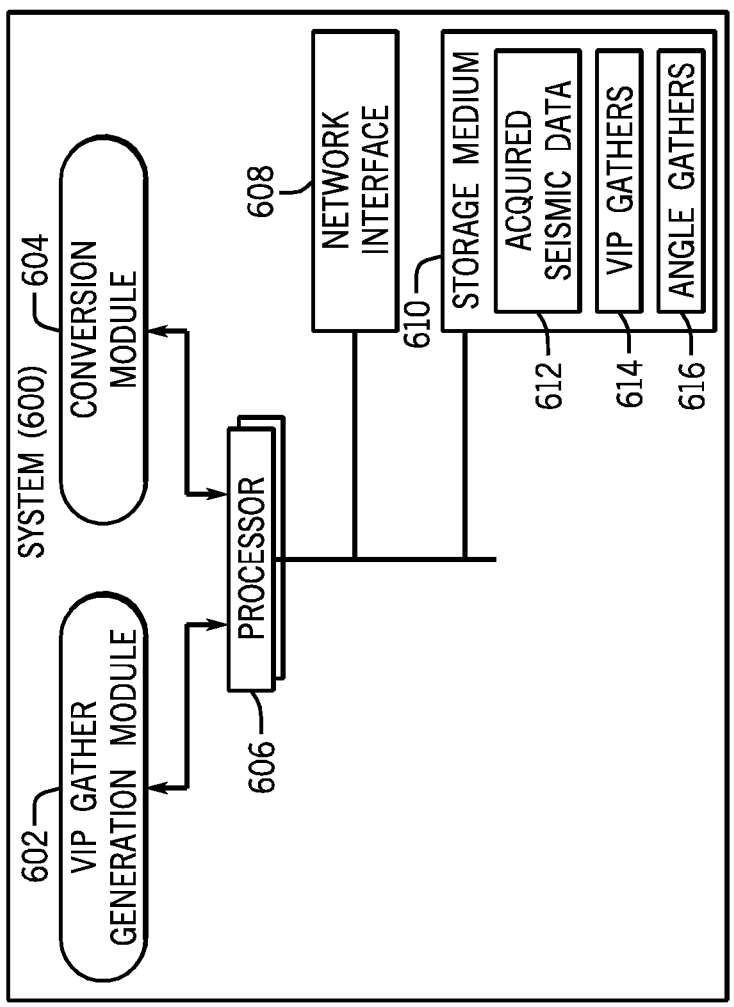
FIG. 6 is a block diagram of an example system according to some implementations.

FIG. 6 is a block diagram of an example system 600 in which modules according to some implementations can be implemented. The system 600 can be implemented with a computer or multiple computers. The system 600 includes a VIP gather generation module 602 to produce VIP gathers from acquired seismic data as discussed above. Additionally, the system 600 can include a conversion module 604 to convert between VIP gathers and angle gathers, as discussed above.

The VIP gather generation module 602 and conversion module 604 can be implemented as machine-readable instructions that are executable on one or multiple processors 606. A processor can include a microprocessor, microcontroller, processor module or subsystem, programmable integrated circuit, programmable gate array, or another control or computing device.

The processor(s) 606 can be connected to a network interface 608 to allow the system 600 to communicate over a network. In addition, the processor(s) 606 can be connected to a storage medium (or storage media) 610, which can store various types of information, including acquires seismic data 612, VIP gathers 614, and angle gathers 616.

The storage medium (or storage media) 608 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method, comprising:
   receiving, by a system comprising a processor, acquired data that corresponds at least in part to a target structure;
   forming, by the system, one or more vector image partition (VIP) gathers from at least part of the acquired data, wherein the one or more VIP gathers comprise bins of the acquired data, the bins partitioned based on different values of an offset between a source location of a seismic source and a surface image location, the surface image location on a surface and projected from an image location within the target structure;

converting, by the system, the one or more VIP gathers into one or more angle gathers, the converting comprising mapping the one or more VIP gathers to the one or more angle gathers using a source direction of a source seismic wave; and performing, by the system, tomography processing using the one or more angle gathers to produce an image relating to the target structure.

2. The method of claim 1, wherein the converting comprises converting the one or more VIP gathers into one or more approximate angle gathers.

3. The method of claim 2, wherein the converting uses an approximate velocity model.

4. The method of claim 2, wherein the converting uses a one-dimensional (1D) velocity model.

5. The method of claim 3, wherein the mapping comprises using the approximate velocity model to map the one or more VIP gathers to the one or more angle gathers.

6. The method of claim 3, wherein using the approximate velocity model comprises using the approximate velocity model to compute a source direction of a source seismic wave.

7. The method of claim 6, wherein the source direction in the mapping the one or more VIP gathers to the one or more angle gathers includes the computed source direction.

8. The method of claim 1, further comprising:
mapping a moveout of the one or more angle gathers to a domain of the one or more VIP gathers.

9. The method of claim 8, further comprising performing tomography processing using the mapped moveout.

10. An article comprising at least one non-transitory machine-readable storage medium storing instructions that upon execution cause a system to:
receive acquired data that corresponds at least in part to a subsurface formation;
form one or more vector image partition (VIP) gathers from the acquired data, wherein the one or more VIP gathers comprise bins of the acquired data, the bins partitioned based on different values of an offset between a source location of a seismic source and a surface image location, the surface image location on a surface above the subsurface formation and projected from an image location within the subsurface formation, the image location being a location of a seismic trace in the acquired data;
convert the one or more VIP gathers to one or more angle gathers, the converting comprising mapping the one or more VIP gathers to the one or more angle gathers using a source direction of a source wave; and
perform tomography processing using the one or more angle gathers to produce an image of the subsurface formation.

11. The article of claim 10, wherein the converting uses a velocity model of the subsurface formation that includes velocities as a function of a plurality of coordinates.

12. The article of claim 10, wherein the converting uses a velocity model of the subsurface formation that includes velocities as a function of one coordinate, and wherein the one or more angle gathers are approximate one or more angle gathers, and wherein applying the processing comprises mapping data of the approximate one or more angle gathers to a domain of the one or more VIP gathers.

13. The article of claim 10, wherein the one or more angle gathers are for corresponding different values of an angle between a direction of the source wave and a direction that is normal to a dip.

14. The article of claim 13, wherein the converting comprises:
decomposing a particular one of the one or more VIP gathers into a plurality of dip components for respective dips.

15. The article of claim 14, wherein the converting uses an angle mapping function that maps between the angle and a difference between the direction of the source wave and the direction that is normal to the dip.

16. A system, comprising:
at least one processor to:
receive acquired data that corresponds at least in part to a target structure;
form one or more vector image partition (VIP) gathers from the acquired data, wherein the one or more VIP gathers comprise bins of the acquired data, the bins partitioned based on different values of an offset between a source location of a seismic source and a surface image location, the surface image location on a surface and projected from an image location within the target structure;
convert the one or more VIP gathers to one or more angle gathers the converting comprising mapping the one or more VIP gathers to the one or more angle gathers using a source direction of a source seismic wave; and
perform tomography processing using the one or more angle gathers to produce an image of the target structure.

17. The method of claim 1, wherein the angle gathers are for corresponding different values of an angle between a direction of a source wave and a direction that is normal to a dip.

18. The system of claim 16, wherein the angle gathers are for corresponding different values of an angle between a direction of a source wave and a direction that is normal to a dip.

* * * * *